United States Patent
Naka et al.

(10) Patent No.: US 10,522,149 B2
(45) Date of Patent: Dec. 31, 2019

(54) CALL CONTROL SYSTEM AND CALL CONTROL METHOD

(71) Applicant: Hitachi Information & Telecommunication Engineering, Ltd., Yokohama-shi, Kanagawa (JP)

(72) Inventors: Yo Naka, Nakai (JP); Takashi Sugiyama, Nakai (JP)

(73) Assignee: Hitachi Information & Telecommunication Engineering, Ltd., Kanagawa (JP)

( * ) Notice: Subject to any disclaimer, the term of this patent is extended or adjusted under 35 U.S.C. 154(b) by 179 days.

(21) Appl. No.: 15/866,631

(22) Filed: Jan. 10, 2018

(65) Prior Publication Data
US 2018/0286405 A1 Oct. 4, 2018

(30) Foreign Application Priority Data
Mar. 29, 2017 (JP) ................................. 2017-065885

(51) Int. Cl.
*G10L 15/26* (2006.01)
*G10L 15/18* (2013.01)
*H04M 3/51* (2006.01)

(52) U.S. Cl.
CPC ........ *G10L 15/265* (2013.01); *G10L 15/1822* (2013.01); *H04M 3/5175* (2013.01); *H04M 3/5183* (2013.01)

(58) Field of Classification Search
None
See application file for complete search history.

(56) References Cited

U.S. PATENT DOCUMENTS

| | | | |
|---|---|---|---|
| 8,606,576 B1* | 12/2013 | Barr | G10L 15/22 379/88.01 |
| 8,676,273 B1* | 3/2014 | Fujisaki | H04M 1/6505 455/567 |
| 8,706,486 B1* | 4/2014 | Devarajan | G06F 21/6245 704/235 |
| 8,712,757 B2* | 4/2014 | Hamilton, II | H04L 41/00 379/93.01 |
| 10,200,824 B2* | 2/2019 | Gross | G06F 3/0488 |

(Continued)

FOREIGN PATENT DOCUMENTS

| | | |
|---|---|---|
| JP | 2009-170953 A | 7/2009 |
| JP | 2016-119634 A | 6/2016 |

*Primary Examiner* — Thuykhanh Le
(74) *Attorney, Agent, or Firm* — Mattingly & Malur, PC

(57) ABSTRACT

An information processor requests a recognition result manager to transmit recording information about a call including a keyword and a recognition result of speech recognition using an extension number as a key. The manager transmits the recording information about the call including the keyword corresponding to the extension number and the recognition result of the speech recognition to the processor. The processor displays a recognition result of speech recognition of the call including the keyword on a display unit. Upon receiving an input of an instruction to perform speech playback, the processor transmits recording information in association with text displayed on the display unit to a recorder. The recorder transmits speech data corresponding to the recording information to the processor. The processor plays back speech data corresponding to the recording information.

8 Claims, 21 Drawing Sheets

(56) References Cited

U.S. PATENT DOCUMENTS

| | | | | |
|---|---|---|---|---|
| 10,229,680 B1* | 3/2019 | Gillespie | | G10L 15/22 |
| 2001/0044326 A1* | 11/2001 | Shibuya | | H04M 1/274558 |
| | | | | 455/566 |
| 2002/0095292 A1* | 7/2002 | Mittal | | G10L 21/06 |
| | | | | 704/270 |
| 2008/0059193 A1* | 3/2008 | Huang | | G10L 15/00 |
| | | | | 704/260 |
| 2009/0018832 A1* | 1/2009 | Mukaigaito | | G10L 15/1815 |
| | | | | 704/251 |
| 2009/0097634 A1* | 4/2009 | Nambiar | | H04M 3/5183 |
| | | | | 379/265.09 |
| 2009/0156181 A1* | 6/2009 | Athsani | | H04L 67/06 |
| | | | | 455/414.2 |
| 2011/0238495 A1* | 9/2011 | Kang | | G06Q 30/02 |
| | | | | 705/14.49 |
| 2011/0276568 A1* | 11/2011 | Fotev | | G06F 16/951 |
| | | | | 707/728 |
| 2012/0303439 A1* | 11/2012 | Flitcroft | | G06Q 10/107 |
| | | | | 705/14.36 |
| 2013/0110565 A1* | 5/2013 | Means, Jr. | | G06Q 10/06 |
| | | | | 705/7.11 |
| 2013/0266127 A1* | 10/2013 | Schachter | | G10L 25/48 |
| | | | | 379/88.01 |
| 2014/0095175 A1* | 4/2014 | Lee | | G10L 15/26 |
| | | | | 704/275 |
| 2015/0003595 A1* | 1/2015 | Yaghi | | G06Q 10/063 |
| | | | | 379/85 |
| 2015/0071427 A1* | 3/2015 | Kelley | | G06Q 30/0202 |
| | | | | 379/265.09 |
| 2015/0213512 A1* | 7/2015 | Spievak | | G06Q 30/0275 |
| | | | | 705/14.71 |
| 2015/0379562 A1* | 12/2015 | Spievak | | H04M 3/5158 |
| | | | | 379/265.09 |
| 2016/0085366 A1* | 3/2016 | Chi | | G06F 3/0488 |
| | | | | 345/173 |
| 2016/0173693 A1* | 6/2016 | Spievak | | G06Q 30/0202 |
| | | | | 379/265.09 |
| 2017/0019534 A1* | 1/2017 | Qin | | H04M 3/436 |
| 2018/0018705 A1* | 1/2018 | Tognetti | | G06Q 30/0269 |

* cited by examiner

FIG.6

IP EXTENSION INFORMATION TABLE 1066

| EXTENSTION NUMBER 1066a | IP ADDRESS 1066b |
|---|---|
| 1002 | 192.168.20.2 |
| 1003 | 192.168.20.3 |
| 1004 | 192.168.20.4 |
| ⋮ | ⋮ |

FIG. 7

RECORDING INFORMATION TABLE 1067

| CALL RECORDING UNIT ID | RECORDING ID | RECORDING START TIME | IP ADDRESS | SPEECH DATA FILE |
|---|---|---|---|---|
| recdev001 | rec001 | 20170318 120103 | 192.168.1.12 | recf01.wav |
| recdev003 | rec004 | 20170319 100756 | 192.168.1.16 | recf02.wav |
| ⋮ | ⋮ | ⋮ | ⋮ | ⋮ |

FIG. 8

SPEECH DATA TABLE  1068

| SPEECH DATA ID | SPEECH DATA FILE |
|---|---|
| a001 | recf01.wav |
| a002 | recf02.wav |
| ⋮ | ⋮ |

MONITOR INFORMATION TABLE 1070

| MONITOR ID | SPEECH DATA FILE |
|---|---|
| m001 | recf05.wav |
| m002 | recf06.wav |
| ⋮ | ⋮ |

FIG. 10

RECOGNITION RESULT TABLE 1095

| CALL RECORDER ID (1095a) | RECORDING ID (1095b) | EXTENSION NUMBER (1095c) | CALL ID (1095d) | UTTER-ANCE ID (1095e) | UTTER-ANCE DATE AND TIME (1095f) | RECOG-NITION RESULT TEXT (1095g) |
|---|---|---|---|---|---|---|
| recdev001 | rec001 | 1002 | c001 | s001 | 20170318 120313 | recf01.json |
| recdev003 | rec004 | 1003 | c004 | s003 | 20160319 100824 | recf02.json |
| ⋮ | ⋮ | ⋮ | ⋮ | ⋮ | ⋮ | ⋮ |

FIG. 11

KEYWORD INFORMATION TABLE 1107

1107a                                  1107b

| KEYWORD TYPE | KEYWORD CHARACTER STRING |
|---|---|
| OPERATOR'S APOLOGIES | WE APOLOGIZE FOR |
| OPERATOR'S APOLOGIES | NO, WE ARE AFRAID NOT |
| CUSTOMER'S EMOTION | NONSENSE |
| SPECIFIC WORDS | PRODUCT INVENTORY |
| ESSENTIAL WORDS | THANK YOU FOR CALLING US |
| ⋮ | ⋮ |

FIG. 12

KEYWORD DETECTION INFORMATION TABLE 1108

| RECORDING ID | CALL ID | UTTER-ANCE ID | KEYWORD TYPE | KEYWORD CHARACTER STRING | APPEAR-ANCE COUNT |
|---|---|---|---|---|---|
| 1108a | 1108b | 1108c | 1108d | 1108e | 1108f |
| rec001 | c001 | s001 | OPERATOR'S APOLOGIES | WE APPOLOGIZE FOR | 3 |
| rec004 | c004 | s003 | OPERATOR'S APOLOGIES | NO, WE ARE AFRAID NOT | 2 |
| ⋮ | ⋮ | ⋮ | ⋮ | ⋮ | ⋮ |

FIG. 13

SPEECH DATA LIST    1135

| SPEECH DATA ID |
|---|
| a004 |
| a006 |
| a007 |

⋮

CALL CONTROL SYSTEM AND CALL CONTROL METHOD

BACKGROUND OF THE INVENTION

The present invention relates to a call control system and a call control method, and more specifically to a call control system and a call control method that are preferable for supervisors to keep track of conversations between customers and operators in real time for appropriately coping with troubles and customer complaints in situations where at a call center, the supervisors simultaneously monitor the contents of the calls between the customers and the operators.

At call centers or offices, in the case where troubles occur on the content of a call between a customer who is talking on a phone and an operator or in the case where troubles are about to occur between a customer and an operator, the operator sometimes sends an alert request for asking support to a supervisor who is a manager at a call center, or who is in charge of operation.

The supervisor has to evaluate the contents of calls made by operators for preventing troubles from occurring regardless of the presence or absence of alert requests from operators. In the case where troubles occur, the supervisor has to appropriately cope with the troubles. A technique in which a supervisor evaluates the contents of calls made by operators for coping with troubles as described above is disclosed in Japanese Unexamined Patent Application Publication No. 2009-170953, for example. A call center system is disclosed in Japanese Unexamined Patent Application Publication No. 2009-170953. In the system, after a call between a customer and an operator is finished, it is automatically confirmed whether a pre-registered specific word is included in the content of the call. If such a word is included, a supervisor is notified of recording data (a speech recording file) and a recording data identifier in correspondence with the recording data (S105 in FIG. 2, paragraph 0030).

Japanese Unexamined Patent Application Publication No. 2016-119634 discloses a call monitoring method. In the method, when a predetermined keyword is included in a call, the content of the call is displayed as a balloon on a seating list window (FIG. 11), a supervisor keeps track of a conversation between an operator and a customer, and appropriately provides a suitable action.

According to the technique described in Japanese Unexamined Patent Application Publication No. 2016-119634, the supervisor can keep track of a conversation between an operator and a customer in real time on a call including a predetermined keyword (a no-good ward that is recognized as a problem in a conversation with a customer), and the supervisor can also confirm the content of the call in more detail with another screen (FIG. 12).

However, the supervisor merely confirms the content of a call that could have a problem with text. The technique described in Japanese Unexamined Patent Application Publication No. 2016-119634 provides no scheme with which the supervisor directly hears the actual call.

An object of the present invention is to provide a call control system and a call control method that enables the improvement of monitoring operation efficiency achieved by a supervisor and enables the improvement of customer service quality provided by operators at a call center with a configuration in which the supervisor directly hears an actual call in an environment that enables the text display of the content of a call between the customer and the operator.

SUMMARY OF THE INVENTION

A call control system according to an aspect of the present invention is preferably a call control system that recognizes and displays speech data of a call at a call terminal, the system including: a call recorder configured to record a call; a speech recognizer configured to perform speech recognition on the speech data to convert the speech data into text; a recognition result manager configured to store a recognition result of the speech recognizer; and an information processor having a display unit and a speech output unit. The call recorder, the speech recognizer, the recognition result manager, and the information processor are connected to one another via a network. The call recorder transmits the speech data of the call to the speech recognizer. The speech recognizer transmits a recognition result of the speech data to the recognition result manager. The recognition result manager holds a keyword information table, detects a keyword from the recognition result of the speech data converted into text, and stores recording information about a call including the keyword and a recognition result of the speech recognition in correspondence with each other. The information processor requests the recognition result manager to transmit the recording information about the call including the keyword and the recognition result of the speech recognition using an extension number as a key. The recognition result manager transmits the recording information about the call including the keyword corresponding to the extension number and the recognition result of the speech recognition to the information processor. The information processor displays a recognition result of speech recognition of the call including the keyword on the display unit. Upon receiving an input of an instruction to perform speech playback, the information processor transmits recording information in association with text displayed on the display unit to the recorder. The recorder transmits speech data corresponding to the recording information to the information processor. The information processor plays back the speech data corresponding to the recording information.

BRIEF DESCRIPTION OF DRAWINGS

FIG. 6 is a diagram of an exemplary IP extension information table;

FIG. 7 is a diagram of an exemplary recording information table;

FIG. 8 is a diagram of an exemplary speech data table;

FIG. 9 is a diagram of an exemplary monitor information table;

FIG. 10 is a diagram of an exemplary recognition result table;

FIG. 11 is a diagram of an exemplary keyword information table;

FIG. 12 is a diagram of an exemplary keyword detection information table;

FIG. 13 is a diagram of an exemplary speech data list;

DESCRIPTION OF THE PREFERRED EMBODIMENT

In the following, an embodiment of the present invention will be described with reference to FIGS. 1 to 21.

First, referring to FIG. 1, the outline of the configuration and processes of a call control system according to an embodiment will be described.

The call control system according to the embodiment will be described, with a call center system used in a call center as an example.

Figure 1:
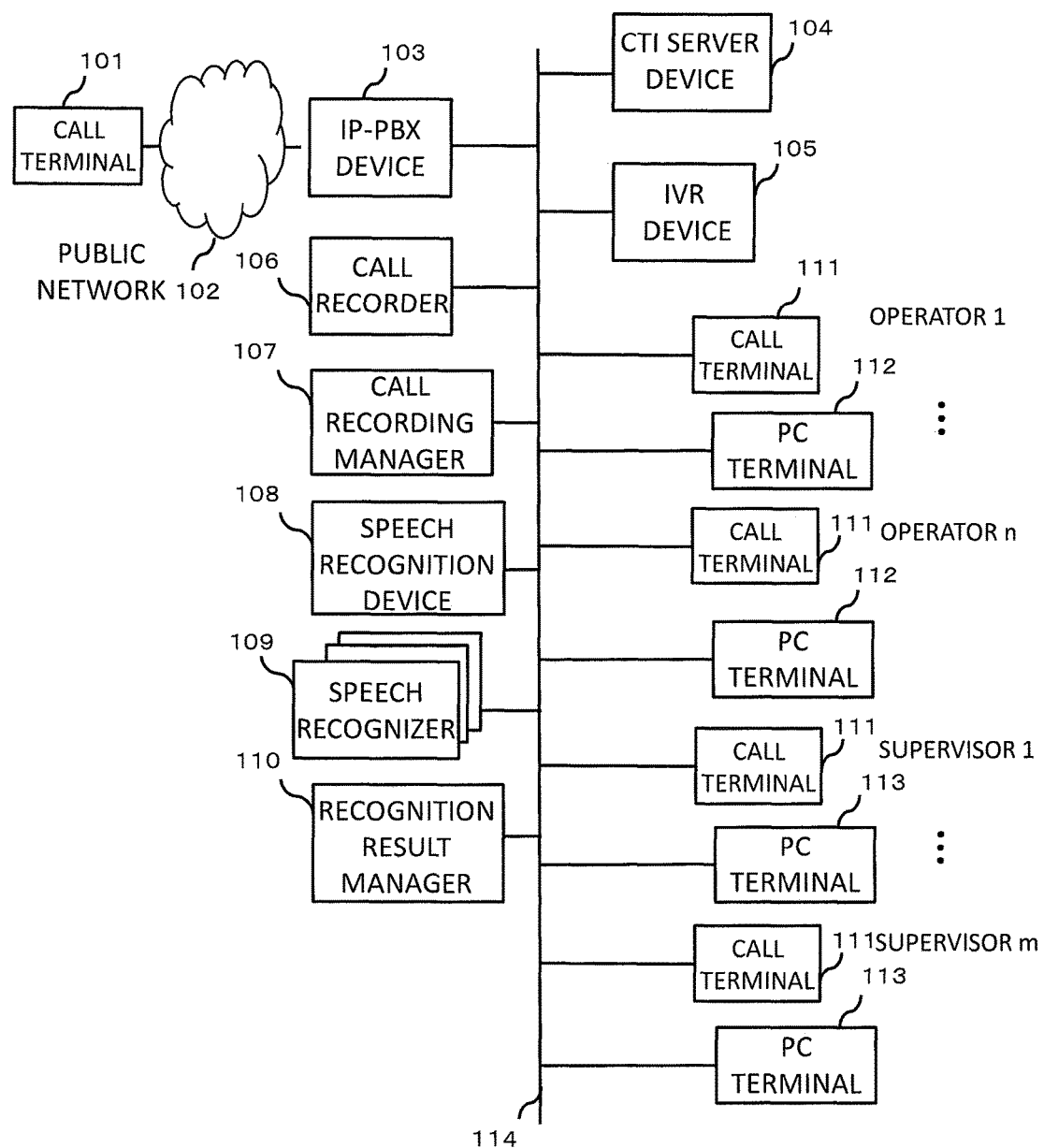
FIG. 1 is an overall structure chart of a call control system according to an embodiment.

As illustrated in FIG. 1, this call center system has a configuration in which a call terminal 101 owned by a caller such as a customer who makes a phone call is connected to an Internet Protocol-Private Branch eXchange (IP-PBX) device 103 via a public network 102, and the IP-PBX device 103 is connected to an operator call terminal 111 through a network 114 for a conversation. The operator can manipulate the telephone of the call terminal 111 through an operator PC terminal 112. When an incoming call from a caller is displayed on the operator PC terminal 112, the operator gives acknowledgement from the PC terminal 112, the call terminal 111 performs acknowledge operation, and then the caller and the operator start a conversation.

The call center system has supervisors who manage and direct operators. The supervisor monitors situations using the call terminals 111 and a supervisor PC terminal 113, and manipulates these terminals as necessary. On the supervisor PC terminal 113, a call terminal telephone control function included in the PC terminal 112 operates as well as a management tool that displays call center operation information for an administrator operates. The supervisor PC terminal 113 includes a typical display for displaying information and data, software for hearing speech, and an audio output unit, such as a headphone device, not illustrated in the drawing.

The call center system is configured to include the IP-PBX device 103, a computer telephony integration (CTI) server device 104, an interactive voice response (IVR) device 105, a call recorder 106, a call recording manager 107, a speech recognition controller 108, speech recognizers 109, and a recognition result manager 110, which are connected to one another through the network 114.

The IP-PBX device 103 performs, for example, the protocol conversion between an internet protocol (IP) network and the public network 102 and the control of incoming calls and outgoing calls. The CTI server device 104 is a device that is the core of call control in the call center. The CTI server device 104 has a function to manage the situations of the call center, such as transmitting call status information received from the IP-PBX device 103 to the operator PC terminal 112 and to the supervisor PC terminal 113. The IVR device 105 is a device that performs speech processing including a primary voice response such as guidance to a call from a caller. The call recorder 106 is a device that generates recording data by call recording processing. The call recording manager 107 is a device that manages recording data and call information added to the recording data and specifies a speech recognizer 109 that performs speech recognition for the call recorder 106. The speech recognition controller 108 is a device that selects one of the speech recognizers 109 when the call recording manager 107 makes a request for speech recognition and returns an identifier indicating the selected speech recognizer 109 to the call recording manager 107, taking into account of the working conditions of the speech recognizers 109 and the load of hardware of the speech recognizers 109. The speech recognizer 109 is a device that includes a speech recognition engine and retrieves a keyword from the recorded speech of a call or converts the speech into call text in response to a request. The recognition result manager 110 is a device that manages data recognized and converted into text at the speech recognizer 109.

Next, referring to FIGS. 2 to 5, the configuration of the components of the call control system will be described in detail.

First, referring to FIG. 2, the configuration of the call recorder 106 will be described.

Figure 2:
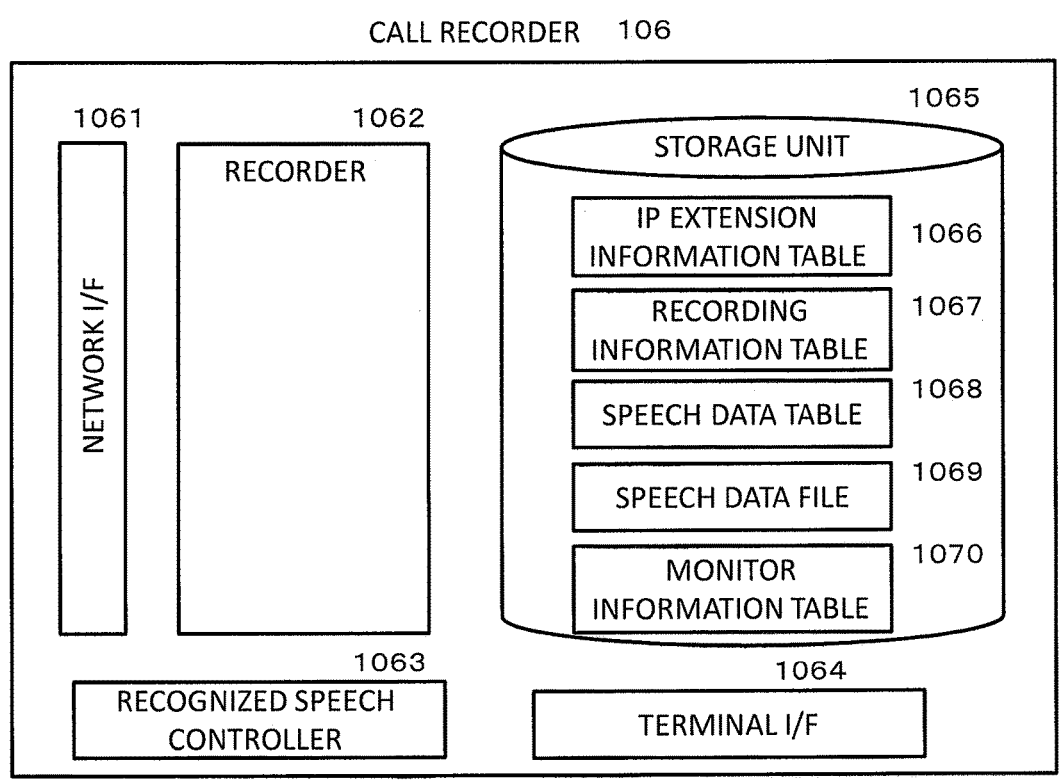
FIG. 2 is a block diagram of the configuration of a call recorder.

As illustrated in FIG. 2, the call recorder 106 includes a network interface (I/F) 1061, a recorder 1062, a recognized speech controller 1063, a terminal I/F 1064, and a storage unit 1065. The network I/F 1061 is a component that interfaces with the IP network and receives real-time transport protocol (RTP) packets. The recorder 1062 is a component that records a call in accordance with the RTP packet. The recognized speech controller 1063 is a component that transmits recorded speech data to the speech recognizer 109. The terminal I/F 1064 is a component that interfaces between the operator PC terminals 112 and the supervisor PC terminals 113. The storage unit 1065 is a component that stores tables and data. On the storage unit 1065 of the call recorder 106, an IP extension information table 1066, a recording information table 1067, a speech data table 1068, a speech data file 1069, and a monitor information table 1067 are stored. Note that, the detail of the tables will be described later.

Next, referring to FIG. 3, the configuration of the speech recognizer 109 will be described.

Figure 3:
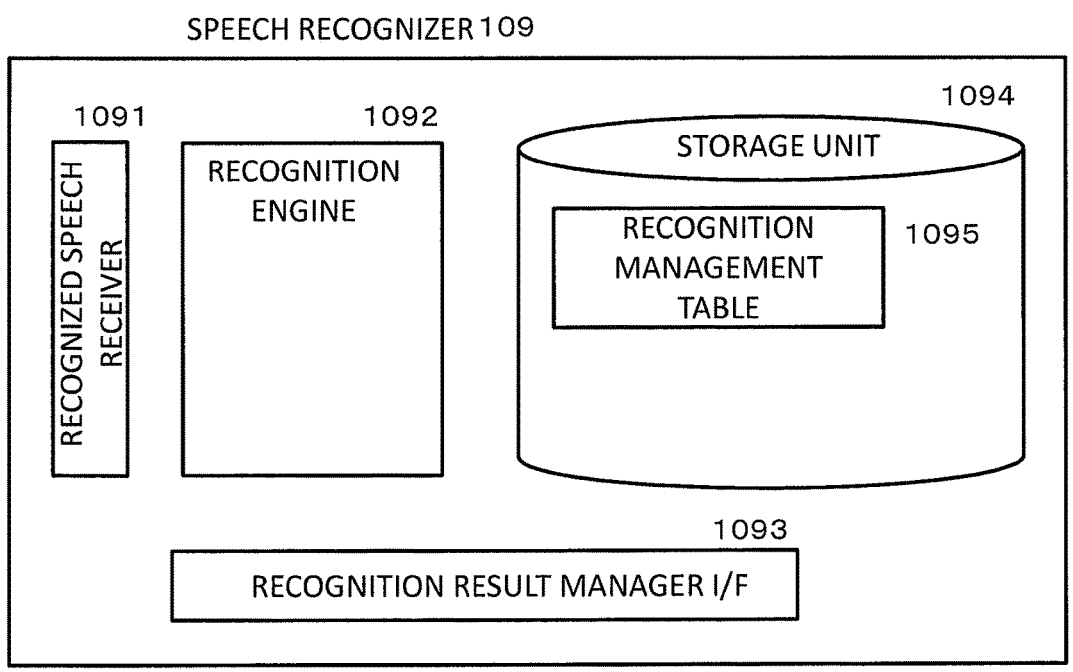
FIG. 3 is a block diagram of the configuration of a speech recognizer.

As illustrated in FIG. 3, the speech recognizer 109 includes a recognized speech receiver 1091, a recognition engine 1092, a recognition result manager I/F 1093, and a storage unit 1094. The recognized speech receiver 1091 is a component that receives speech data from the call recorder 106. The recognition engine 1092 is a component that performs speech recognition on speech data to convert the speech data into text. The recognition result manager I/F 1093 is a component that interfaces with the recognition result manager 110. The storage unit 1094 is a component that stores tables and data. On the storage unit 1094 of the speech recognizer 109, a recognition result table 1095 is stored. Note that, the detail of the table will be described later.

Next, referring to FIG. 4, the configuration of the recognition result manager 110 will be described.

Figure 4:
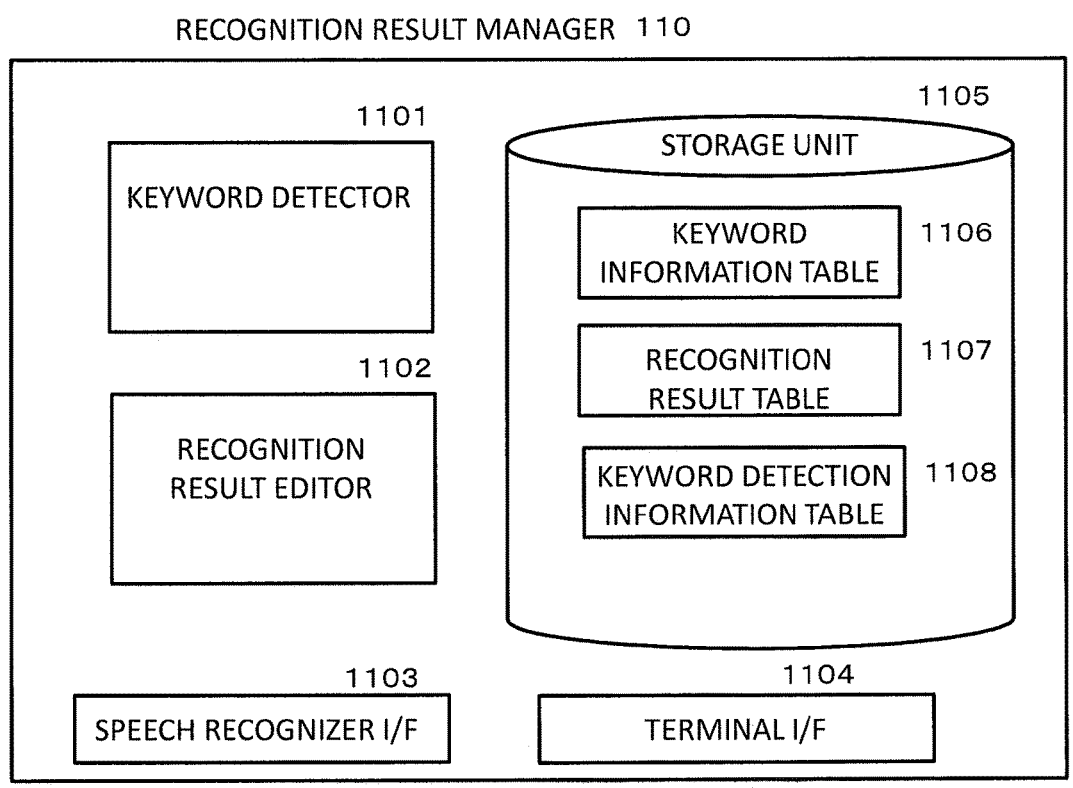
FIG. 4 is a block diagram of the configuration of a recognition result manager.

As illustrated in FIG. 4, the recognition result manager 110 includes a keyword detector 1101, a recognition result editor 1102, a speech recognizer I/F 1103, a terminal I/F 1104, and a storage unit 1105. The keyword detector 1101 is a component that detects a predetermined keyword in the text in the recognition result received from the speech recognizer 109. The recognition result editor 1102 is a component that edits the text, from which the keyword has been detected, to the PC terminal 113. The speech recognizer I/F 1103 is a component that interfaces with the speech recognizer 109. The terminal I/F 1104 is a component that interfaces between the operator PC terminals 112 and the supervisor PC terminals 113. The storage unit 1105 is a component that stores tables and data. On the storage unit 1105 of the recognition result manager 110, a keyword information table 1106, a recognition result table 1107, and a keyword detection information table 1108 are stored. Note that, the detail of the tables will be described later.

Next, referring to FIG. 5, the configuration of the supervisor PC terminal 113 will be described.

Figure 5:
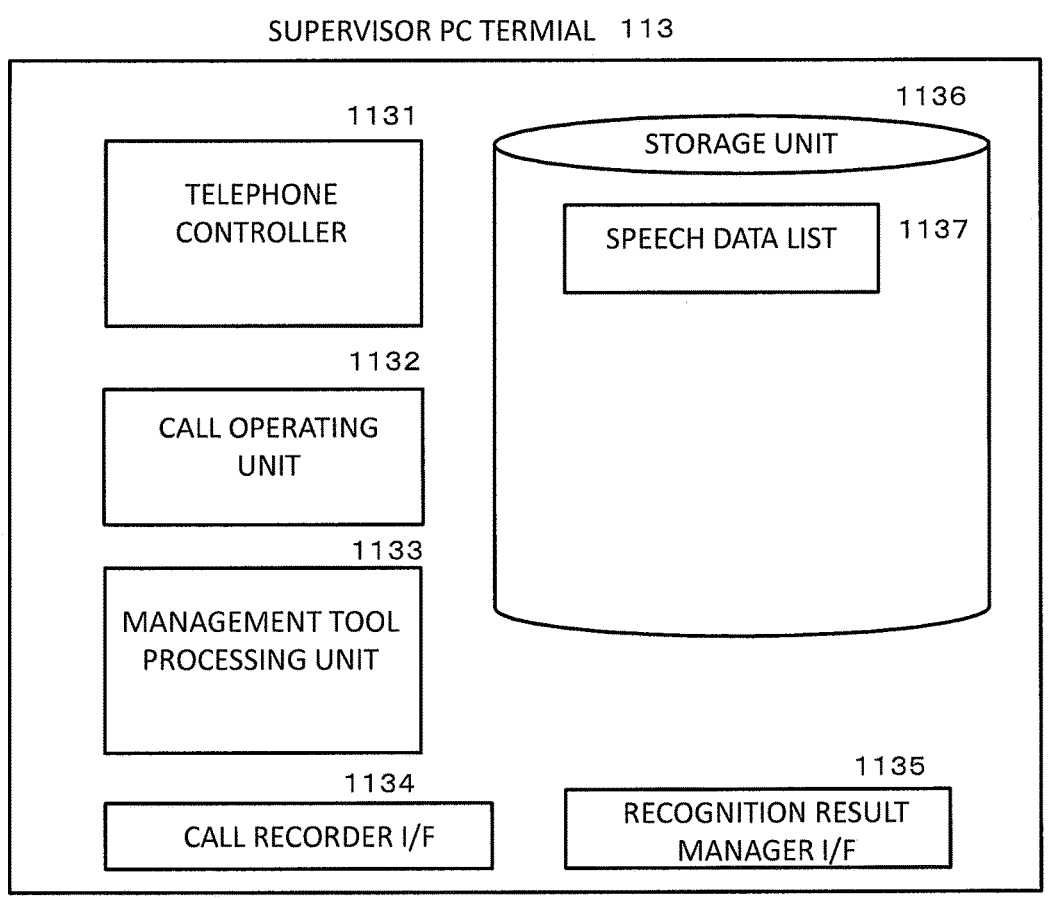
FIG. 5 is a block diagram of the configuration of a PC terminal.

As illustrated in FIG. 5, the supervisor PC terminal 113 includes a telephone controller 1131, a call operating unit 1132, a management tool processing unit 1133, a call recorder I/F 1134, a recognition result manager I/F 1135, and a storage unit 1136. The telephone controller 1131 is a component that controls the call terminal 111 connected from the PC terminal 113. The call operating unit 1132 is a component that plays back speech data relating to calls. The management tool processing unit 1133 is a component that processes a management tool (a utility program) installed on the PC terminal 113. The call recorder I/F 1134 is a component that interfaces with the call recorder 106. The recognition result manager I/F 1135 is a component that interfaces with the recognition result manager 110. The storage unit 1136 is a component that stores tables and data. On the storage unit 1136 of the PC terminal 113, a speech data list 1137 is stored. Note that, the detail of the speech data list 1137 will be described later.

Next, referring to FIGS. 6 to 13, the data structure used in the call control system will be described.

As illustrated in FIG. 6, the IP extension information table 1066 is a table that shows the correspondence between the extension number and the IP address correspondence table, and is held on the call recorder 106. The IP extension information table 1066 means that the call terminal 111 having the extension number in the field of an extension number 1066a has the IP address in the field of an IP address correspondence table 1066b.

The recording information table 1067 is a table that holds information relating to call recordings, and is stored on the call recorder 106. As illustrated in FIG. 7, the recording information table 1067 includes the fields of a call recorder ID 1067a, a recording ID 1067b, a recording start time 1067c, an IP address 1067d, and a speech data file 1067e. On the call recorder ID 1067a, IDs to identify the call recorders 106 are stored. On the recording ID 1067b, IDs to identify the entries of the call recordings are stored. On the recording start time 1067c, the start time of the call recording is stored. On the IP address 1067d, the IP address of the call terminal 111 engaging with a call is stored. On the speech data file 1067e, the file name of a speech file (a pathname on the file system) is stored.

As illustrated in FIG. 8, the speech data table 1068 is a table that shows the correspondence between the speech data ID and the speech data file, and is held on the call recorder 106. The speech data table 1068 means that the speech data identifier in the field of a speech data ID 1068a is in correspondence with the speech data file name in the field of a speech data file 1068b.

As illustrated in FIG. 9, the monitor information table 1069 is a table that shows the correspondence between the monitor ID and the speech data file, and is held on the call recorder 106. The monitor information table 1069 means that the monitor identifier in the field of a monitor ID 1069a is in correspondence with the speech data file name in the field of a speech data file 1069b.

The recognition result table 1095 is a table that holds information relating to the speech recognition results. The recognition result table 1095 is held on the speech recognizer 109, copied on the recognition result manager 110, and held as the recognition result table 1107. As illustrated in FIG. 10, the recognition result table 1095 has the fields of a call recorder ID 1095a, a recording ID 1095b, an extension number 1095c, a call ID 1095d, an utterance ID 1095e, an utterance date and time 1095f, and a recognition result text 1095g. On the call recorder ID 1095a, IDs to identify the call recorders 106 are stored. On the recording ID 1095b, IDs to identify the entries of call recordings are stored. On the extension number 1095c, the extension numbers of the call terminals 111 at the center are stored. On the call ID 1095d, IDs to identify calls are stored. On the utterance ID 1095e, IDs to identify utterances are stored. Here, the utterances are units that separate a call. The speech recognizer 109 handles the utterances as units when performing speech recognition, and stores the recognition result for each utterance in a file. On the utterance date and time 1095f, the time to start an utterance is stored. On the recognition result text 1095g, a text file name when the utterance is converted into text is stored.

The keyword information table 1107 is a table that stores information relating to keywords, which are preset keywords with interest by the supervisor to monitor a call between an operator and a customer. The recognition result manager 110 holds the keyword information table 1107. As illustrated in FIG. 11, the keyword information table 1107 has the fields of a keyword type 1107a and a keyword character string 1107b. On the keyword type 1107a, the categories of keyword types are stored. On the keyword character string 1107b, the character strings of keywords are stored. In FIG. 11, for example, the keyword "operator's apologies" in the keyword type 1107a is a keyword used by an operator to make apologies to a customer. The keyword "We apologize for all the trouble we have caused for this" and the keyword "No, we are afraid not", for example, correspond to the keywords showing apologies. The keyword "customer's emotions" in the keyword type 1107a is a keyword that can estimate customer's emotions. In FIG. 11, the keyword "Nonsense" corresponds to the keyword showing customer's emotions. For the categories of keyword types, categories of sorting including "specific words" and "essential words", for example, may be provided for use in statistics of calls, quality analysis, and education for operators in the center.

The keyword detection information table 1108 is a table that holds information relating to a keyword and obtained by detecting the keyword for each call. The keyword detection information table 1108 is held on the recognition result manager 110. As illustrated in FIG. 12, the keyword detection information table 1108 has the fields of a recording ID 1108a, a call ID 1108b, an utterance ID 1108c, a keyword type 1108d, a keyword character string 1108e, and an appearance count 1108f. On the recording ID 1108a, IDs to identify the entries of call recordings are stored. On the call ID 1108*b*, IDs to identify calls are stored. On the utterance ID 1108*c*, IDs to identify utterances are stored. On the keyword type 1108*d* and the keyword character string 1108*e*, the type of the detected keyword and the character string of the detected keyword are respectively stored. On the appearance count 1108*f*, the total value of the appearance counts of the keyword character string in the call is stored.

As illustrated in FIG. 13, the speech data list 1137 is a list held at the PC terminal 113 to make access to speech stored on the call recorder 106. The speech data list 1137 holds speech data IDs that are identifiers indicating speech data in a queue structure.

Next, referring to FIGS. 14 to 17, the detail of processing in the call control system will be described.

First, in FIG. 14, a series of processes from outgoing calling from an external call terminal to displaying the recognition result on the PC terminal will be described.

First, it is supposed that an outgoing call is made from the call terminal 101 owned by a customer (A01), the outgoing call is exchanged at the IP-PBX device 103, and the outgoing call is accepted at the operator call terminal 111 in the call center (A02).

The IP-PBX device 103 transmits a RTP packet to the call terminal 111, and simultaneously transfers a copied RTP packet to the call recorder 106 (A03).

The call recorder 106 reports that a call is started to the call recording manager 107 using the extension number as a parameter (A04). The call recorder 106 starts split recording in accordance with the RTP packet (S04*a*, S04*b*, ... ), makes reference to the IP extension information table 1060 in FIG. 6, and writes necessary information on the recording information table 1067 in FIG. 7.

The call recording manager 107 makes reference to a call recognition information table (not shown) using the received extension number as a key, and determines whether to perform speech recognition on the telephone call received at the extension number (S02). The call recognition information table is supposed to include information provided for each extension number whether to perform real time speech recognition on a call received at the extension number. When determining that real time speech recognition has to be performed on the call, the call recording manager 107 asks the speech recognition controller 108 about the speech recognizer 109 to perform speech recognition (A05). The speech recognition controller 108 manages the working conditions and loads of the speech recognizers 109. The speech recognition controller 108 determines the speech recognizer 109 that is the most suitable for use in the present stage (S03), and makes a reply to the call recording manager 107 using the ID of the speech recognizer 109 as a recognizer ID (A06). The call recording manager 107 then transfers the recognizer ID to the call recorder 106 (A07).

The call recorder 106 receives the recognizer ID, and transfers the speech data, on which speech recognition has to be performed, to the speech recognizer 109 corresponding to the recognition ID (A08). Here, the recognizer ID may be the IP address of the speech recognizer 109, or the call recorder 106 may have a configuration to make access to the speech recognizer 109 in accordance with the recognizer ID of the speech recognizer 109.

The speech recognizer 109 performs speech recognition on the speech data transmitted from the call recorder 106 (S04). Here, the call recorder 106 transmits the call recorder ID, the recording ID, the recording start date and time, and the extension number as parameters, in addition to the speech data. The speech recognizer 109 then writes the result of speech recognition on the recognition result table 1095 in FIG. 10. Subsequently, the speech recognizer 109 transfers the information written on the recognition result table 1095 to the recognition result manager 110 (A09).

The recognition result manager 110 makes reference to the keyword information table 1107 in FIG. 11, detects a keyword (S05), and writes information relating to the keyword on the keyword detection information table 1108.

The supervisor PC terminal 113 requests the recognition result manager 110 to transmit recording information and the recognition result using the extension number as a parameter (A10). In response to the request, the recognition result manager 110 edits the recording information and the recognition result in a data format that is displayable on the supervisor PC terminal 113 (S06), and transmits the recording information and the recognition result (A11). Here, the recognition result manager 110 transmits at least the recording ID, the utterance date and time, and text in the recognition result that is associated with the keyword. The most typical interface between the recognition result manager 110 and the supervisor PC terminal 113 is considered to be a configuration in which the recognition result manager 110 is a web server, converts the recognition result into a hypertext markup language (HTML) format, and transfers the converted recognition result to the supervisor PC terminal 113. The supervisor PC terminal 113 then displays the recognition result in association with the information relating to the call (e.g. the extension number) and the recognition result text using the function of a web browser. An example of a non-limiting configuration may be a configuration in which the recognition result manager 110 edits the recognition result in an original format, dedicated application software is installed on the supervisor PC terminal 113, and the edited result is displayed on the supervisor PC terminal 113.

The supervisor PC terminal 113 displays the recognition result including the keyword on the screen (S07). The user interface for the supervisor PC terminal 113 will be described later.

Next, referring to FIG. 15, a chasing playback process will be described.

Figure 14:
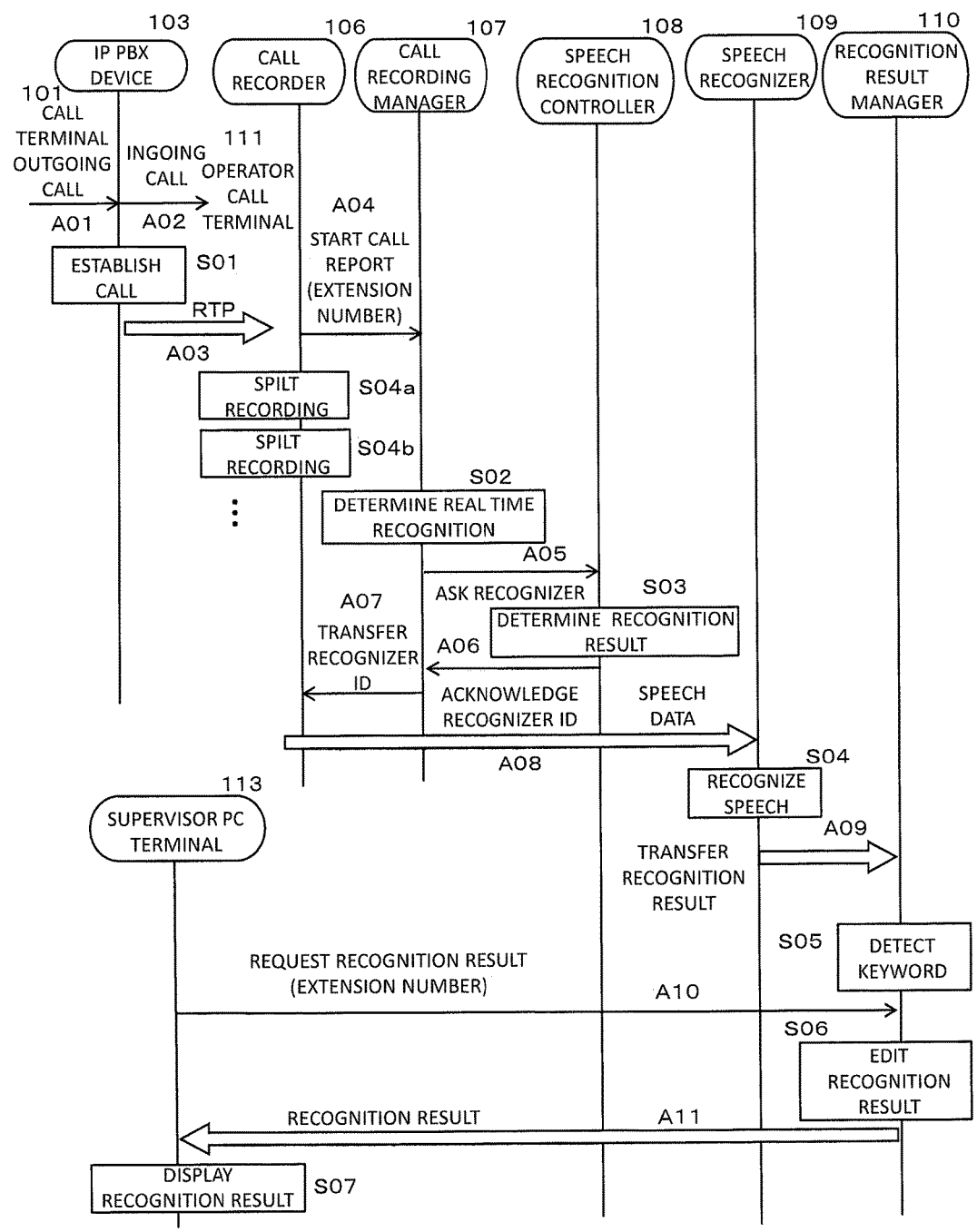
FIG. 14 is a sequence diagram of a series of processes from outgoing calling from an external call terminal to displaying a recognition result on a PC terminal.

The process of split-recording the RTP packet at the call recorder 106 is similar to the processes in FIG. 14 (A03, S04*a*, S04*b*, ... ).

Here, it is supposed that the supervisor PC terminal 113 instructs chasing playback (S10). The term "chasing playback" means that in order that the supervisor monitors the call between the operator and the customer presently in conversation, the recorded speech data of the call is played back (preferably played back at 2× speed (fast forward playback)) for hearing the call. Note that a user interface to instruct chasing playback from the supervisor PC terminal 113 will be described later.

In response to the instruction, the supervisor PC terminal 113 instructs the call recorder 106 to perform chasing playback using the recording ID as a parameter (A20).

The call recorder 106 generates a speech data ID for speech data of the recording ID, and writes the speech data ID paired with the speech data file on the speech data table 1068 in FIG. 8 (S11). The call recorder 106 transmits the speech data ID to the supervisor PC terminal 113 at every certain time period (A21). As in FIG. 13, the supervisor PC terminal 113 stores the speech data ID on the speech data list 1135. Subsequently, the supervisor PC terminal 113 makes a speech playback request using a pair of the recording ID and the received speech data ID on the speech data list as a parameter (A22). The call recorder 106 transmits the speech data of the corresponding speech data file to the supervisor PC terminal 113 (A23), and the supervisor PC terminal 113 plays back the speech (S12).

Figure 16:
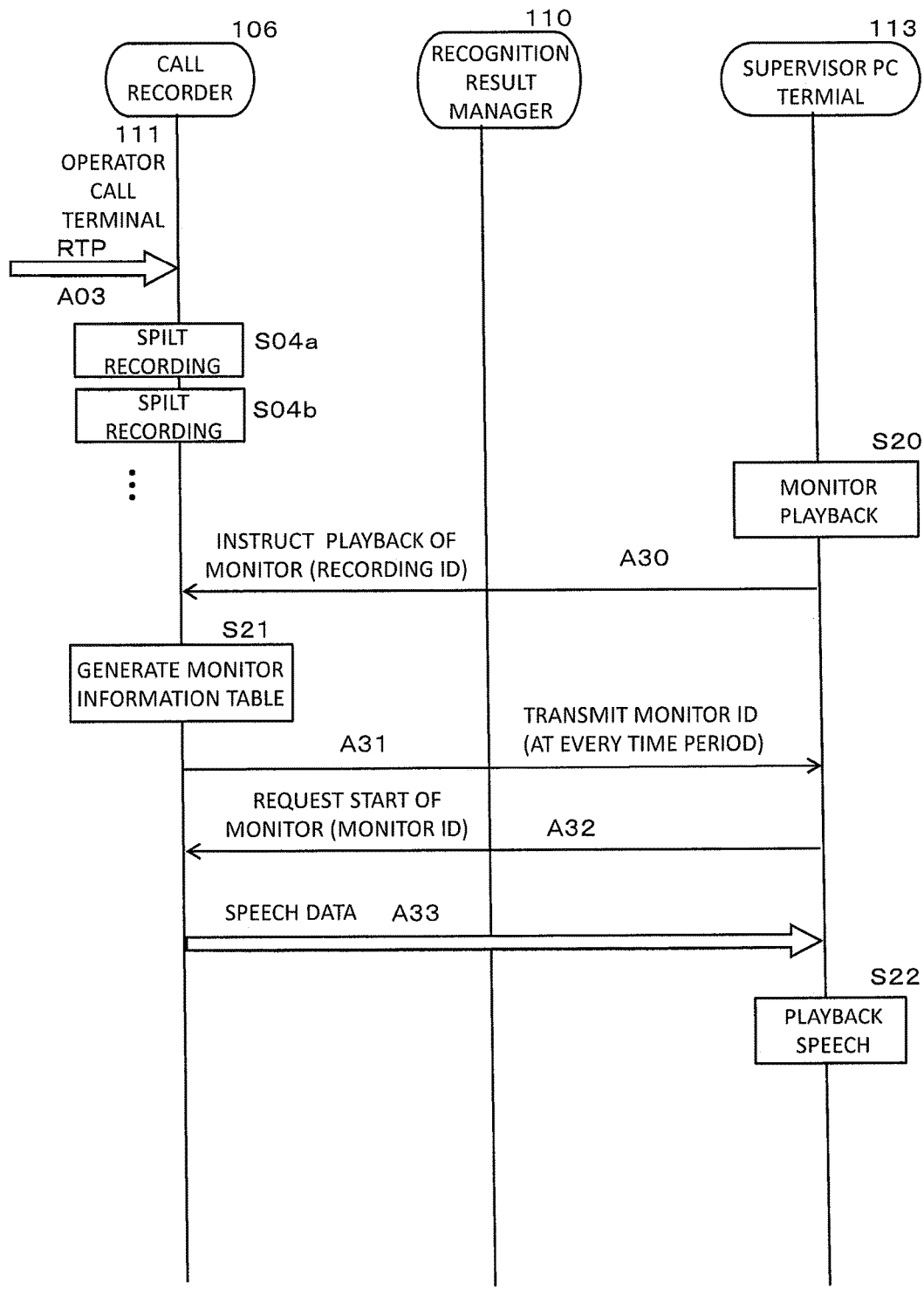
FIG. 16 is a sequence diagram of processes of monitor playback.
Figure 17A:
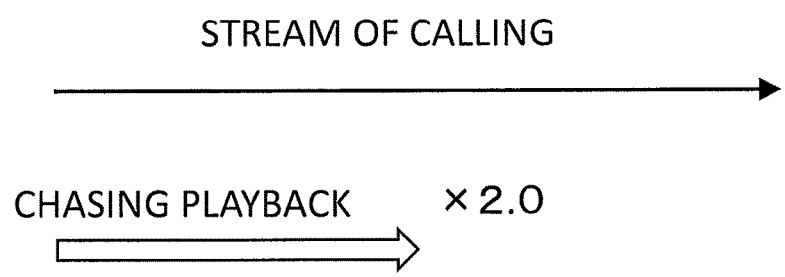
FIG. 17A is a conceptual diagram of the relationship between chasing playback and monitor playback.
Figure 17B:
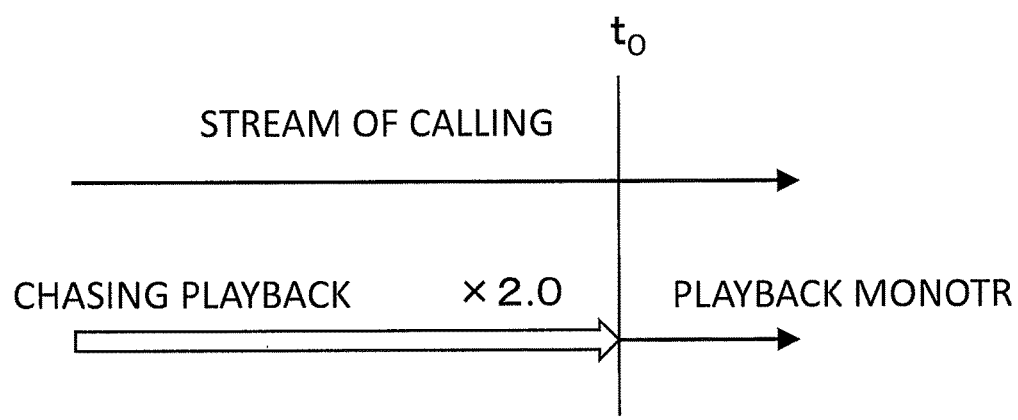
FIG. 17B is a conceptual diagram of the relationship between chasing playback and monitor playback.

Next, referring to FIG. 16 and FIGS. 17A and 17B, the process of monitor playback will be described.

The term "monitor playback" means that the supervisor directly hears the call between the operator and the customer. Monitor playback is always performed at 1× speed.

First, referring to FIGS. 17A and 17B, the relationship between chasing playback and monitor playback in the call control system according to the embodiment will be described. As illustrated in FIG. 17A, the supervisor hears the call between the operator and the customer at 2× speed by chasing playback. As illustrated in FIG. 17B, it is supposed that the supervisor catches up the call at time t0. At this time, the call operating unit 1132 of the supervisor PC terminal 113 automatically switches to monitor playback. The timing at which the supervisor PC terminal 113 switches from chasing playback to monitor playback is timing at which no speech ID is obtained from the call recorder 106, i.e., no recorded speech data is left.

Figure 15:
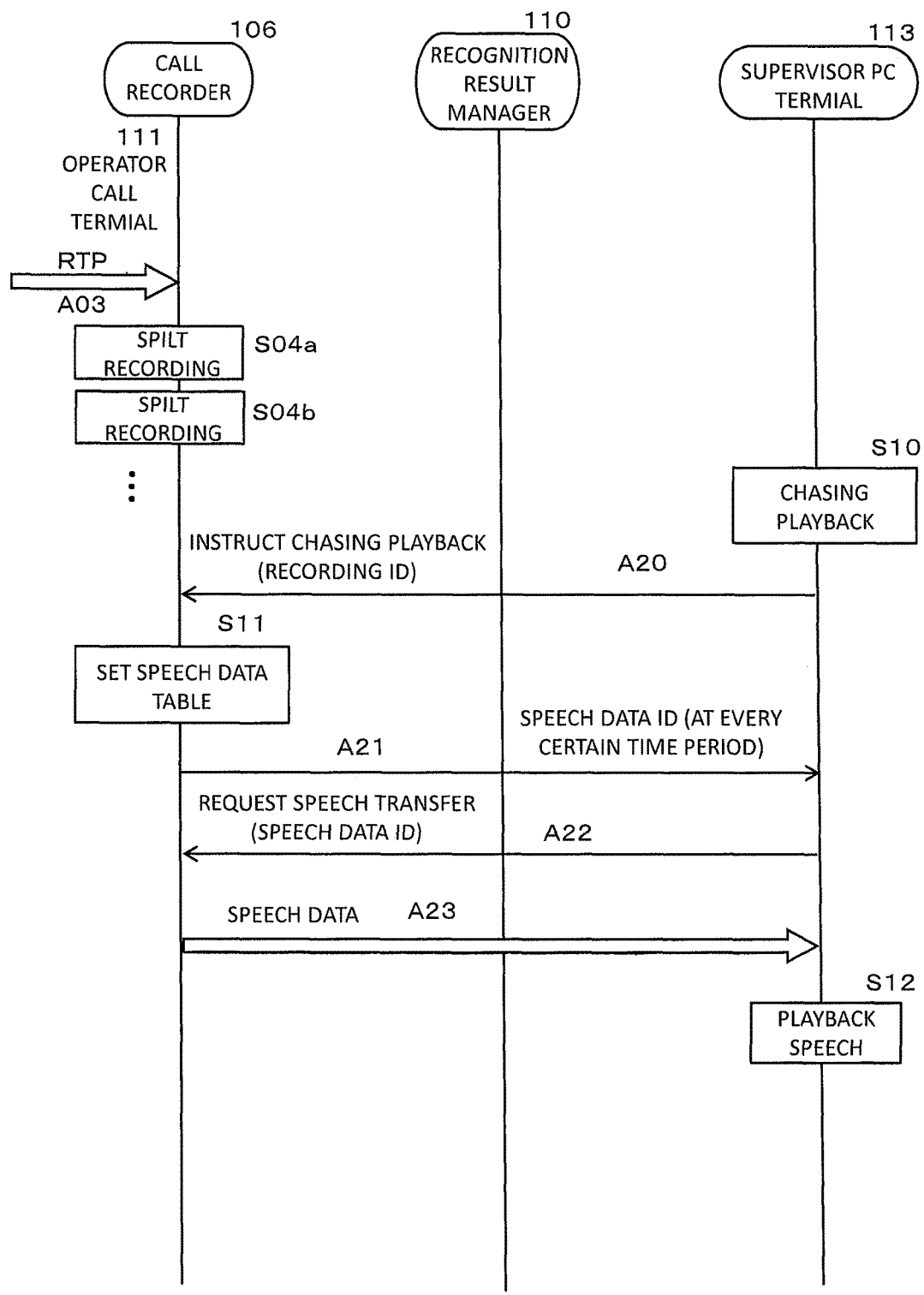
FIG. 15 is a sequence diagram of processes of chasing playback.

First, the process of split-recording the RTP packet at the call recorder 106 is similar to the processes in FIGS. 14 and 15 (A03, S04a, S04b, . . . ).

Here, it is supposed that the supervisor PC terminal 113 instructs monitor playback (S20). The instruction of monitor playback from the supervisor PC terminal 113 is explicitly specified by the supervisor, or the instruction is made when playback catches up in chasing playback as described above. Note that a user interface to instruct monitor playback from the supervisor PC terminal 113 will be described later.

In response to the instruction, the supervisor PC terminal 113 instructs the call recorder 106 to perform monitor playback using the recording ID as a parameter (A30).

The call recorder 106 generates a monitor ID, and writes the monitor ID paired with the speech data file on the monitor information table 1070 in FIG. 9 (S21). The call recorder 106 transmits the monitor ID to the supervisor PC terminal 113 at every certain time period (A31). Subsequently, the supervisor PC terminal 113 makes a monitor start request using the received monitor ID as a parameter (A32). The call recorder 106 transmits the speech data of the corresponding speech data file to the supervisor PC terminal 113 (A33), and monitor playback is performed at the supervisor PC terminal 113 (S22).

Next, referring to FIGS. 18 to 21, the user interface for the supervisor PC terminal will be described.

Figure 18:
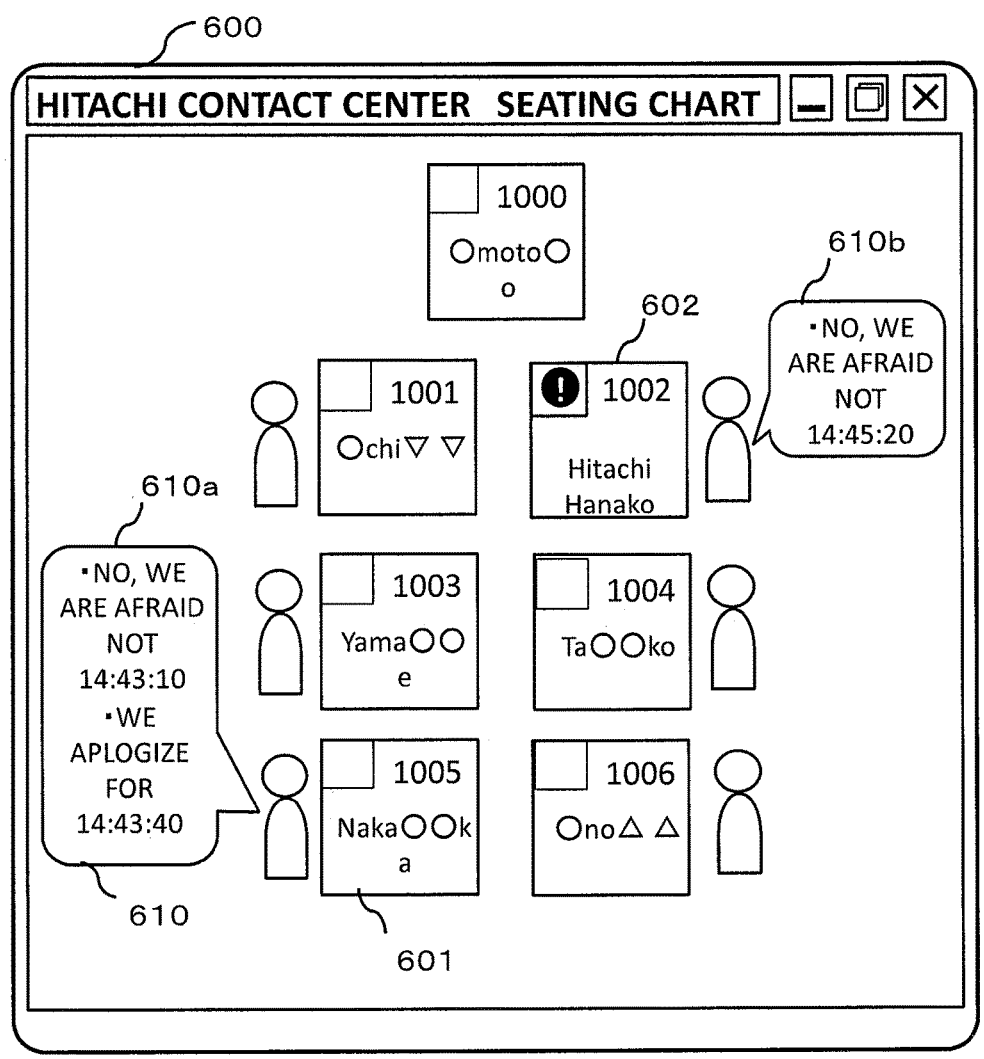
FIG. 18 is a diagram of a seating chart display screen.

When the call center is in operation, a seating chart display screen 600 is displayed on the supervisor PC terminal 113 as illustrated in FIG. 18, for example, in order to monitor the situations of the operators. As shown at "Hanako Hitachi" having an extension number 1002 in the seating chart, an alarm icon is displayed at the seat for an operator who has many appearance counts of the keywords.

On the seating chart display screen 600, the extension number and the operator's name are shown at the individual seat frames, and a keyword display balloon 610 is directly displayed from the illustration of the operator.

Figure 19:
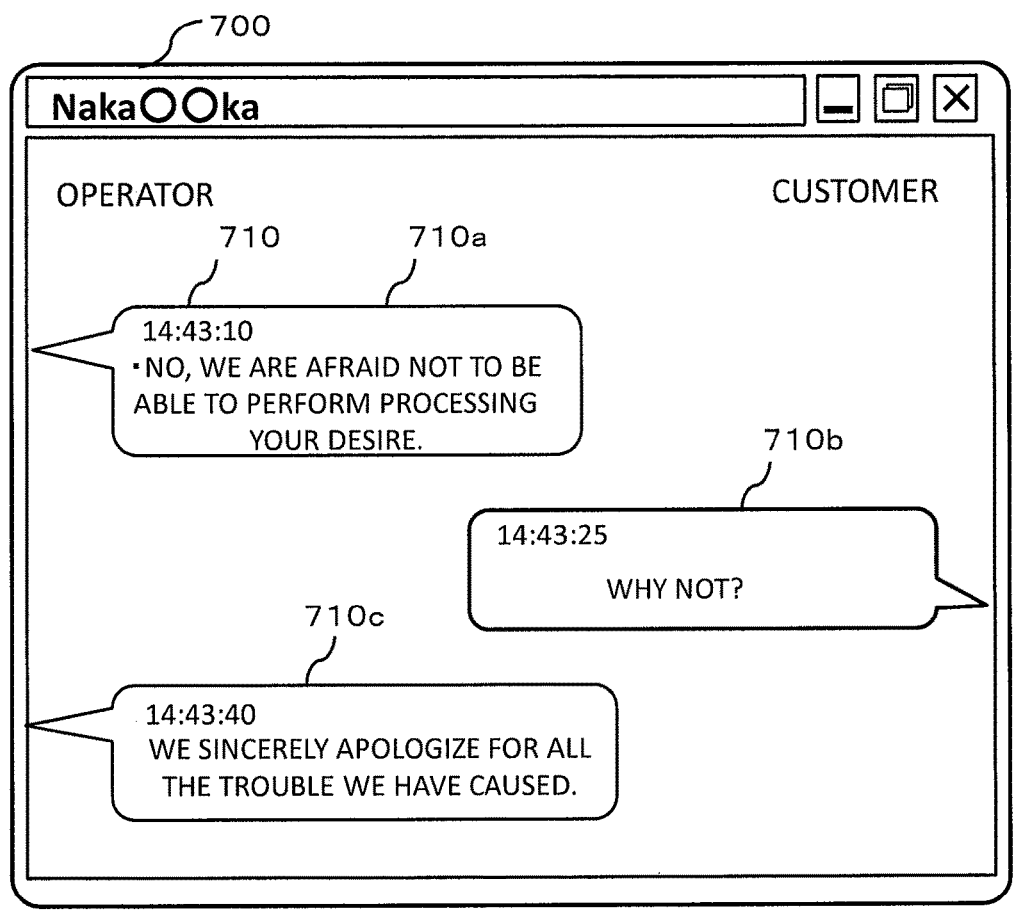
FIG. 19 is a diagram of a call content display screen.

The supervisor can open a call content display screen 700 in FIG. 19 by clicking the keyword display balloon 610. On the call content display screen 700, call content display balloons 710 are displayed. The call content display balloons 710 displayed on the call content display screen 700 display the items of text of recorded calls, on which speech recognition has been performed, subsequent to the clicked keyword display balloon 610a. That is, the content of the conversation of the call at the call terminal corresponding to the seat frame is converted into text in accordance with the extension number, and the text of the content is displayed on the call content display balloon 710.

Call content display balloons 710a and 710c are balloons that show the contents of conversations made by an operator. A call content display balloon 710b is a balloon that shows the content of a conversation made by a customer. The registered keywords are displayed in red or underlined for easy visual recognition. When the content is displayed in the HTML format, for example, on the screen, the keyword only has to be modified with a predetermined tag. Alternatively, a configuration may be possible in which the color of the entire balloon including the keyword is changed to a different color for distinguishing between the keyword and other words. The operator balloons start from the left side, and the customer balloons start from the right side. This configuration enables visual recognition of conversations between the operator and the customer. A configuration may be possible in which the operator is distinguished from the customer with colors, background patterns, and surrounding lines of the call content display balloon 710.

The call content display balloon 710a shows the operator's conversation with the customer at 14:43:10 that "No, we are afraid not to be able to perform processing you have been desired". The call content display balloon 710b shows the customer's conversation at 14:43:25 that "Why not?" The call content balloon 710c shows the operator's conversation with the customer at 14:43:40 that "We sincerely apologize for all the trouble we have caused for this". Note that, it is supposed that recordings are split for every 15 seconds, for example, and displayed time is recorded time.

Here, when the supervisor performs chasing playback of a call, the supervisor clicks the call content display balloons 710a, 710b, and 710c with a mouse. This manipulation enables the display of a chasing playback screen 300 in FIG. 20. On the chasing playback screen 300, chasing playback is performed from the relating conversations of the call on the call content display balloons 710a, 710b, and 710c. This enables the supervisor to play back the speech data of the conversations for hearing the conversations of the call.

The chasing playback screen 300 includes a close button 301, a call information column 310, a monitoring playback button 314, a speech manipulation panel 320, and a chapter list column 340.

The close button 301 is a button that closes this screen. A monitoring playback button 314 is a button that transitions from the chasing playback screen 300 to a monitoring playback screen 400 in FIG. 21.

The call information column 310 is a column that displays information about a call with interest. On the call information column 310, the start date and time of the call, the type of the call, which is an incoming call or an outgoing call, and the extension number in the center are respectively displayed on a start date and time 311, a type 312, and an extension number 313.

The speech manipulation panel 320 is a panel that displays information for playing back the speech of the call and provides manipulations. The speech manipulation panel 320 includes manipulation buttons that are a "go to first" button 321, a "back" button 322, a "little back" button 323, a "playback/pause" button 324, a "little forward" button 325, a "fast forward" button 326, a "next" button 327, a "go to last" button 328, a "stop" button 329, a "lower volume" button 330, and an "increase volume" button 332. For displaying information, a playback position and playback speed display column 333, a mode display column 334, and a volume display column 331 are provided.

The "go to first" button 321 is a button that instructs the playback of the beginning speech file of a chapter. The "back" button 322 is a button that instructs the playback of a speech file one file before the speech file that is being played back. The "little back" button 323 is a button that instructs the return of the speech file from the present playback position to the position five seconds before. The "playback/pause" button 324 is a button that instructs the playback of a selected speech file or that instructs a pause in playback. The "playback/pause" button 324 is a toggle button. When the "playback/pause" button 324 is pressed in playback, the button face is changed to the pause, whereas when the "playback/pause" button 324 is pressed in pause, the button face is changed to the playback. The "little forward" button 325 is a button that instructs the fast forwarding of the speech file from the present playback position to the position ten seconds forward. The "fast forward" button 326 is a button that instructs the playback speed. Every time this button is pressed, the playback speed is changed in a cycle like a cycle of "1× speed", "1.2× speed", "1.4× speed", "1.6× speed", "1.8× speed", "2× speed", and "1× speed". The "next" button 327 is a button that instructs the playback of a speech file one file next to the speech file that is being played back in the chapter. The "go to last" button 328 is a button that instructs the playback of the latest speech file in the chapter. The "stop" button 329 is a button that instructs the halt of playback. The "lower volume" button 330 is a button that instructs the lowering of the volume in present playback. When the volume is expressed by an integer value ranging from "0" to "100", for example, the volume is decreased by −10 points. The "increase volume" button 332 is a button that instructs the increasing of the volume in present playback. When the volume is expressed by an integer value ranging from "0" to "100", for example, the volume is increased by +10 points.

The playback position and playback speed display column 333 displays the position of playback and the speed of playback. The indication of the playback speed is displayed as s× when the speed is s× speed (s is a number expressed by a digit after the decimal point). The mode display column 334 displays the chasing playback mode or the monitoring playback mode. The volume display column 331 displays the present volume indicated by an integer value ranging from "0" to "100".

The chapter list column 340 is a column that displays information about a chapter list, including a chapter number display column 341, a recording start time column 342, an elapsed time column 343, and a status display column 344. The chapter number display column 341 displays chapter numbers individually provided for chapters in descending order. The recording start time column 342 displays the recording start time of a chapter. The elapsed time column 343 displays elapsed time from the beginning of the chapter. The status display column 344 displays the status of a call. When the call is continued, the status "buffering" is displayed, whereas when the call is finished, the status "call finished" is displayed.

Note that, the term "chapter" here is a concept that is provided as a unit for speech playback. The chapter may be separated at speeches in every certain time period (e.g. every 30 seconds), or the chapter may be separated at speeches using the balloons in FIG. 19.

The monitoring playback screen 400 is a screen started from the monitoring playback button 314 of the chasing playback screen 300 to perform the monitor playback of the call.

Figure 20:
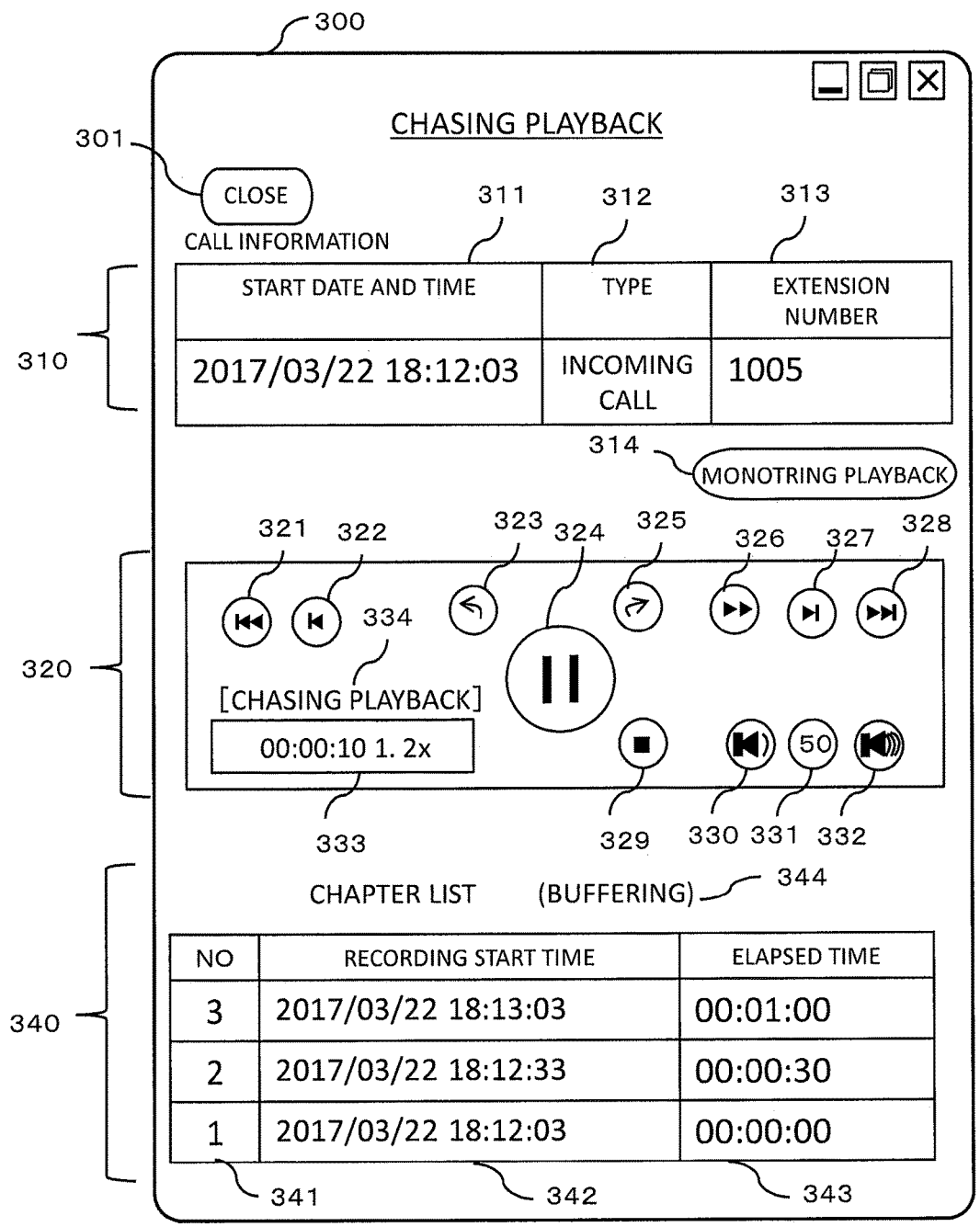
FIG. 20 is a diagram of an exemplary chasing playback screen.
Figure 21:
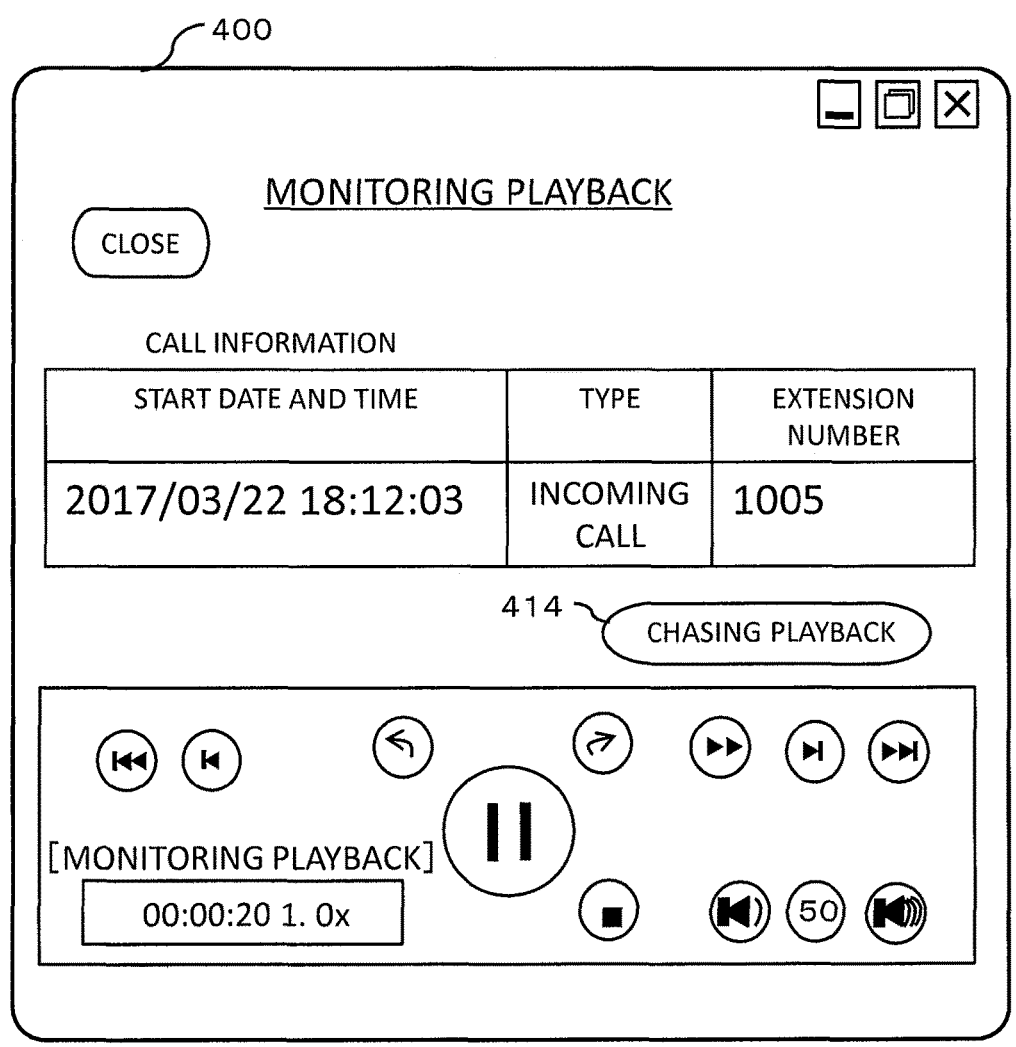
FIG. 21 is a diagram of an exemplary monitoring playback screen.

As illustrated in FIG. 21, the monitoring playback screen 400 has a user interface almost similar to the chasing playback screen 300. However, the monitoring playback screen 400 is different from the chasing playback screen 300 in that the types of buttons are different and the chapter list column 340 is not provided. On the monitoring playback screen 400, a chasing playback button 414 is displayed instead of the monitoring playback button 314. When the chasing playback button 414 is pressed, the chasing playback screen 300 in FIG. 20 is displayed.

According to the embodiment, the text after speech recognition is visually recognized, attention is focused on the call having specific keywords displayed on the balloons, and thus chasing playback and monitoring are enabled. The supervisor directly hears the actual call, and this enables the improvement of monitoring operation efficiency achieved by the supervisor and the improvement of customer service quality provided by operators.

What is claimed is:

1. A call control system that recognizes and displays a recognition result of speech data of a call at a call terminal, the system comprising:
    a call recorder configured to record the call, wherein the call recorder transmits the speech data of the call to the speech recognizer;
    a speech recognizer configured to perform speech recognition on the speech data to convert the speech data into text, wherein the speech recognizer transmits the recognition result of the speech data to the recognition result manager;
    a recognition result manager configured to receive and store the recognition result of the speech data from the speech recognizer; and
    an information processor having a display unit and a speech output unit,
    wherein the call recorder, the speech recognizer, the recognition result manager, and the information processor are connected to one another via a network,
    wherein the recognition result manager holds a keyword information table, detects a keyword from the recognition result of the speech data converted into text, and stores recording information about the call including the keyword and the recognition result of the speech recognition in correspondence with each other,
    wherein the information processor requests the recognition result manager to transmit the recording information about the call including the keyword and the recognition result of the speech recognition using an extension number as a key,
    wherein the recognition result manager transmits the recording information about the call including the keyword corresponding to the extension number and the recognition result of the speech recognition to the information processor,
    wherein the information processor displays the recognition result of speech recognition of the call including the keyword on the display unit,
    wherein upon receiving an input of an instruction to perform speech playback, the information processor transmits recording information in association with text displayed on the display unit to the call recorder,
    wherein the call recorder transmits speech data corresponding to the recording information to the information processor, and
    wherein the information processor plays back the speech data corresponding to the recording information.

2. The call control system according to claim 1,
wherein in chasing playback to play back a past call, the speech data is recorded speech data, and
wherein in monitor playback to hear a present call, the speech data is stream data inputted to the call recorder.

3. The call control system according to claim 2,
wherein when determining that no past speech data is left in playback of speech data in chasing playback, the information processor requests the call recorder to perform monitor playback.

4. The call control system according to claim 1, wherein the recognition result of speech recognition of the call including the keyword is displayed as a balloon.

5. A call control method for a call control system that recognizes and displays a recognition result of speech data of a call at a call terminal,
wherein the call control system includes:
  a call recorder configured to record the call, wherein the call recorder has a step of transmitting the speech data of the call to the speech recognizer;
  a speech recognizer configured to perform speech recognition on the speech data to convert the speech data into text, wherein the speech recognizer has a step of transmitting the recognition result of the speech data to the recognition result manager;
  a recognition result manager configured to receive and store the recognition result of the speech recognizer; and
  an information processor having a display unit and a speech output unit,
wherein the call recorder, the speech recognizer, the recognition result manager, and the information processor are connected to one another via a network,
wherein the recognition result manager holds a keyword information table, and the recognition result manager has steps of: detecting a keyword from the recognition result of the speech data converted into text, and storing recording information about the call including the keyword and the recognition result of the speech recognition in correspondence with each other,
wherein the information processor has a step of requesting the recognition result manager to transmit the recording information about the call including the keyword and the recognition result of the speech recognition using an extension number as a key,
wherein the recognition result manager has a step of transmitting the recording information about the call including the keyword corresponding to the extension number and the recognition result of the speech recognition to the information processor,
wherein the information processor has a step of displaying the recognition result of speech recognition of the call including the keyword on the display unit,
wherein the information processor, upon receiving an input of an instruction to perform speech playback, has a step of transmitting recording information in association with text displayed on the display unit to the call recorder,
wherein the call recorder has a step of transmitting speech data corresponding to the recording information to the information processor, and
wherein the information processor has a step of playing back speech data corresponding to the recording information.

6. The call control method according to claim 5, wherein in chasing playback to play back a past call, the speech data is recorded speech data, and
wherein in monitor playback to hear a present call, the speech data is stream data inputted to the call recorder.

7. The call control method according to claim 6,
wherein when determining that no past speech data is left in playback of speech data in chasing playback, the information processor requests the call recorder to perform monitor playback.

8. The call control method according to claim 5, wherein the recognition result of speech recognition of the call including the keyword is displayed as a balloon.

* * * * *